(12) United States Patent
Lam et al.

(10) Patent No.: US 9,757,670 B2
(45) Date of Patent: Sep. 12, 2017

(54) METHODS FOR MOVING A FILTER ALONG A MANIFOLD ASSEMBLY; FILTER ARRANGEMENTS INCLUDING A FILTER AND A MANIFOLD ASSEMBLY; AND FILTERS

(71) Applicant: Pall Corporation, Port Washington, NY (US)

(72) Inventors: Vincent Lam, Austin, TX (US); Jacob Peter Vanderheyden, Saint Paul, MN (US); Mark William Foohey, Austin, TX (US)

(73) Assignee: Pall Corporation, Port Washington, NY (US)

( * ) Notice: Subject to any disclaimer, the term of this patent is extended or adjusted under 35 U.S.C. 154(b) by 463 days.

(21) Appl. No.: 14/068,851

(22) Filed: Oct. 31, 2013

(65) Prior Publication Data
US 2015/0114896 A1     Apr. 30, 2015

(51) Int. Cl.
| | | |
|---|---|---|
| *B01D 21/24* | (2006.01) | |
| *B01D 29/46* | (2006.01) | |
| *B01D 35/31* | (2006.01) | |
| *B01D 35/30* | (2006.01) | |

(52) U.S. Cl.
CPC .............. *B01D 35/31* (2013.01); *B01D 35/30* (2013.01); *B01D 2201/24* (2013.01); *B01D 2201/303* (2013.01); *B01D 2201/4023* (2013.01); *B01D 2201/4053* (2013.01); *Y10T 29/49817* (2015.01); *Y10T 29/49826* (2015.01)

(58) Field of Classification Search
CPC B01D 35/30; B01D 2201/4023; B01D 29/96; B01D 46/0005
See application file for complete search history.

(56) References Cited

U.S. PATENT DOCUMENTS

| | | | | |
|---|---|---|---|---|
| 5,925,245 A | * | 7/1999 | Bradford | B01D 35/30 210/232 |
| 6,001,249 A | * | 12/1999 | Bailey | C02F 1/003 210/232 |
| D513,304 S | | 12/2005 | Suzuki | |
| 7,021,667 B2 | | 4/2006 | Campbell et al. | |
| 7,338,599 B2 | * | 3/2008 | Hiranga | B01D 29/15 210/232 |

(Continued)

FOREIGN PATENT DOCUMENTS

| | | |
|---|---|---|
| JP | 2003-251110 A | 9/2003 |
| WO | WO 2007/012079 A2 | 1/2007 |

*Primary Examiner* — Ana Fortuna
(74) *Attorney, Agent, or Firm* — Leydig Voit & Mayer

(57) ABSTRACT

To move a filter along a manifold assembly the filter may be seated on a moveable shuttle assembly. Seating the filter on the shuttle assembly may include mating a key portion on the filter with a key portion on the shuttle assembly, each key portion corresponding to a filtration characteristic of the filter. The shuttle assembly and the seated filter may then be moved between a first position, wherein the key portions of the filter and the shuttle assembly are mated to one another and first and second fittings of the filter are spaced from first and second fittings of the manifold assembly, and a second position, wherein the key portions of the filter and the shuttle assembly are mated to one another and the first and second fittings of the filter sealingly engage the first and second fittings of the manifold assembly.

18 Claims, 14 Drawing Sheets

(56) References Cited

U.S. PATENT DOCUMENTS

| | | |
|---|---|---|
| 7,469,932 B2 | 12/2008 | Niermeyer et al. |
| 8,069,991 B2 | 12/2011 | Norris et al. |
| 2004/0182777 A1 | 9/2004 | Stankowski et al. |
| 2011/0211976 A1 | 9/2011 | Magoon et al. |
| 2011/0247974 A1 | 10/2011 | Gale et al. |
| 2013/0031926 A1 | 2/2013 | Huda et al. |
| 2015/0113925 A1* | 4/2015 | Gatica ................. B01D 35/30 55/357 |
| 2015/0114894 A1* | 4/2015 | Foohey ................ B01D 35/30 210/232 |
| 2015/0114896 A1* | 4/2015 | Lam .................... B01D 35/30 210/236 |
| 2015/0129478 A1* | 5/2015 | Lam .................... B01D 35/30 210/232 |

* cited by examiner

METHODS FOR MOVING A FILTER ALONG A MANIFOLD ASSEMBLY; FILTER ARRANGEMENTS INCLUDING A FILTER AND A MANIFOLD ASSEMBLY; AND FILTERS

DISCLOSURE OF THE INVENTION

The present invention relates to methods for moving a filter along a manifold assembly. The filter may include at least first and second fittings, e.g., an inlet fitting and an outlet fitting. The manifold assembly may also include at least first and second fittings and may be part of a larger system, e.g., a processing system or a manufacturing system. The first fitting of the manifold assembly may comprise a fitting for supplying feed or process fluid from the larger system to the inlet fitting of the filter, and the second fitting may comprise a fitting for returning filtered fluid, e.g., filtrate or permeate, from the outlet fitting of the filter to the larger system. The filter may be moved along the manifold assembly to sealingly engage and/or disengage the first and second fittings of the filter and the first and second fittings of the manifold assembly, respectively. For example, the manifold assembly may also include a moveable shuttle assembly. The filter may be positioned on the moveable shuttle assembly, and the moveable shuttle assembly may move the fittings of the filter into and out of sealing engagement with the fittings of the manifold assembly.

In accordance with one aspect of the invention, methods for moving a filter along a manifold assembly may comprise seating the filter on a moveable shuttle assembly. Seating the filter may include mating a key portion on the filter with a key portion on the shuttle assembly. The key portion on the filter has a configuration that corresponds to a filtration characteristic of the filter, and the filtration characteristic may relate to any of a wide variety of characteristics of the filter, including, for example, the removal rating specified for the filter. The key portion on the shuttle assembly has a configuration that both corresponds to the filtration characteristic of the filter and is mateable with the configuration of the key portion on the filter. The methods for moving the filter along the manifold assembly may further include moving the shuttle assembly and the seated filter from a first position to a second position. In the first position, the key portions of the filter and the shuttle assembly are mated to one another, and the first and second fittings of the filter are spaced from the first and second fittings of the manifold assembly. In the second position, the key portions of the filter and the shuttle assembly are mated to one another and the first and second fittings of the filter sealingly engage the first and second fittings of the manifold assembly, respectively.

The present invention also relates to filter arrangements. In accordance with another aspect of the invention, filter arrangements may comprise a filter, a manifold assembly, and a keying mechanism. The filter may have first and second fittings and a filtration characteristic. The filter may also include a housing and a permeable filter medium. The housing may define a fluid flow path within the housing between the first and second fittings, and the permeable filter medium may be arranged in the fluid flow path within the housing to remove one or more substances from a fluid flowing along the fluid flow path. The manifold assembly may include first and second fittings and a moveable shuttle assembly. The keying mechanism may include a key portion on the filter and a key portion on moveable the shuttle assembly. The key portion on the filter may have a configuration that corresponds to the filtration characteristic of the filter. The key portion on the shuttle assembly may have a configuration that both corresponds to the filtration characteristic of the filter and is mateable with the configuration of the key portion on the filter. The shuttle assembly is arranged to receive the filter and is moveable between a first position and a second position. In the first position, the key portion of the filter is mated to the key portion of the shuttle assembly and the first and second fittings of the filter are spaced from the first and second fittings of the manifold assembly. In the second position, the key portion of the filter is mated to the key portion of the shuttle assembly and the first and second fittings of the filter sealingly engage the first and second fittings of the manifold assembly, respectively.

The present invention further relates to filters. In accordance with another aspect of the invention, a filter may comprise first and second fittings, a permeable filter medium, a housing, and a filtration characteristic. The housing may define a fluid flow path within the housing between the first and second fittings, and the permeable filter medium may be arranged in the fluid flow path within the housing to remove one or more substances from a fluid flowing along the fluid flow path. The housing may also include a body having a longitudinal axis and a flange positioned on an upper region of the body. The filter further comprises a key portion on the flange. The key portion of the filter has a configuration that corresponds to the filtration characteristic of the filter and is mateable with a key portion of a manifold assembly that also corresponds to the filtration characteristic of the filter.

Embodiments of the invention, including methods for moving a filter along a manifold assemblies, as well as filter arrangements, assemblages, and elements, are significant advance in the art of filtration. For example, filters and moveable shuttle assemblies, each geared to a particular filtration characteristic, provide the flexibility to meet the varied filtration requirements of virtually all types of systems, regardless of the nature of the fluid being filtered. Yet, the keying mechanism, including the key portions on each filter and shuttle assembly, ensures that only a filter having a particular desired filtration characteristic, for example, as dictated by a specific system—and no other filter—can be seated on the moveable shuttle assembly. Thus, only fittings of a filter having the desired filtration characteristic can be sealingly engaged with the fittings of the manifold assembly, reliably ensuring that the filtration requirements of the specific system are satisfied. Operator error involving mistakenly mounting the wrong filter, i.e., a filter having a filtration characteristic different from the desired filtration characteristic, is thus virtually eliminated.

DESCRIPTION OF EMBODIMENTS OF THE INVENTION

A wide variety of methods for moving a filter along a manifold assembly may embody the invention. Generally, each of these methods comprises seating the filter on a moveable shuttle assembly that is part of a manifold assembly. Seating the filter on the shuttle assembly may include mating a key portion on the filter and a key portion on the shuttle assembly. The key portion on the filter may have a configuration that corresponds to a filtration characteristic of the filter, e.g., the removal rating of the filter. The key portion on the shuttle assembly may have a configuration that both corresponds to the filtration characteristic of the filter and is mateable with the key portion on the filter. For example, the configurations of the key portions may each uniquely correspond to the filtration characteristic, allowing only filters having the particular filtration characteristic to be seated on the shuttle assembly by mating the key portions on the filter and shuttle assembly that correspond to the particular characteristic. Filters having key portions with configurations corresponding to different filtration characteristics, e.g., different removal ratings, may not be mateable with the key portion on the moveable shuttle assembly, preventing these filters from being seated on the shuttle assembly. Consequently, methods embodying the invention may further comprise selecting a filter having a particular filtration characteristic from among a plurality of filters having different filtration characteristics and then seating only the filter having that particular filtration characteristic on the moveable shuttle assembly by mating the key portions that correspond to that filtration characteristic.

Methods for moving the filter along the manifold assembly may further comprise moving the shuttle assembly and the seated filter from a first position to a second position. In the first position of the shuttle assembly, the key portions of the filter and the shuttle assembly are mated to one another. In addition, first and second fittings of the filter are spaced from, e.g., not engaged with, first and second fittings of the manifold assembly. In the second position of the shuttle assembly, the key portions of the filter and the shuttle assembly may be mated to one another, and the first and second fittings of the filter may sealingly engage the first and second fittings of the manifold assembly, respectively. Fluid may then be directed from the manifold assembly through the filter. For many embodiments, the first and second fittings of the filter and the manifold assembly may be disengaged, e.g., after filtering the fluid, by moving the shuttle assembly from the second position to the first position. The filter may then be removed from the shuttle assembly and cleaned or replaced.

Figure 1:
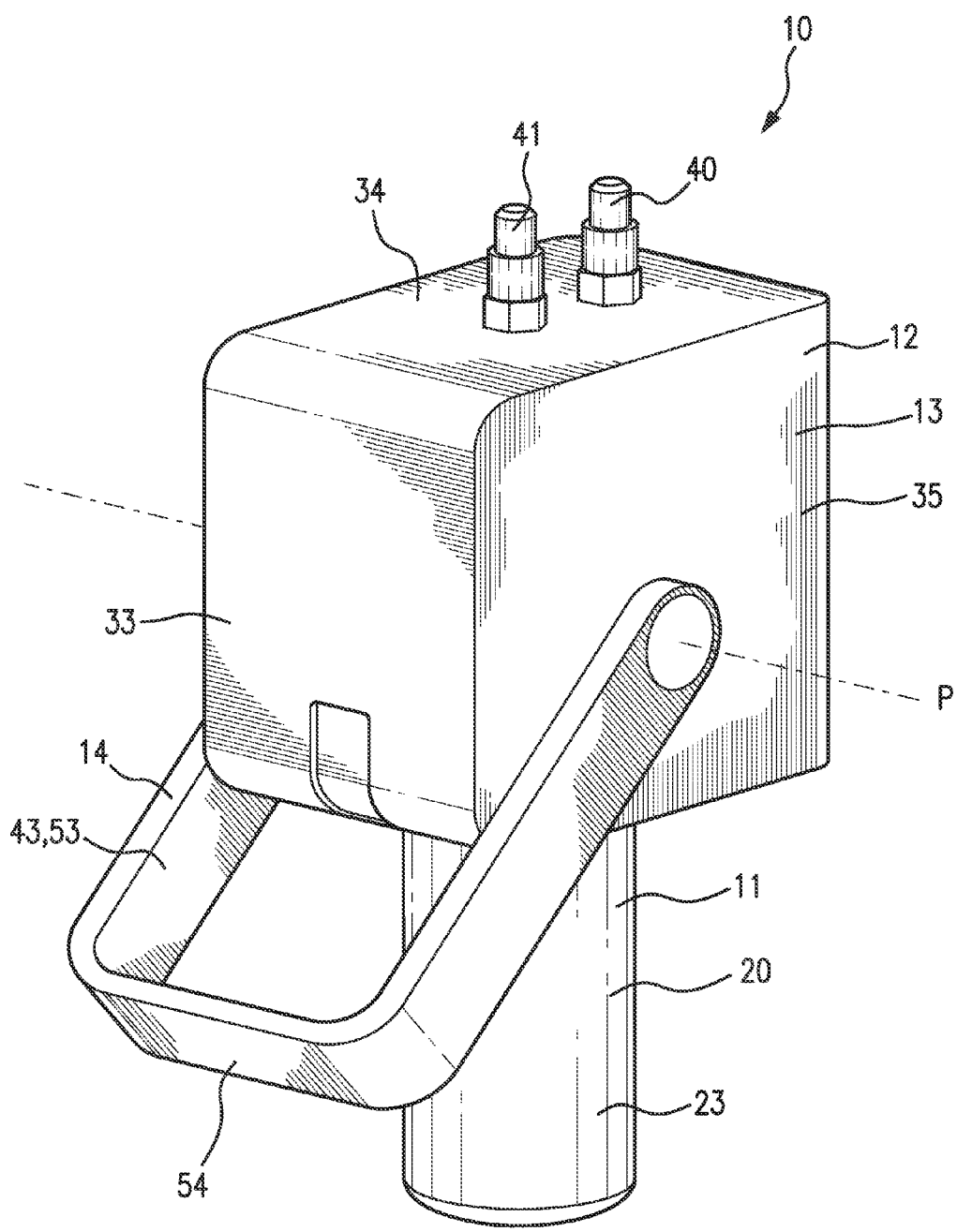
FIG. 1 is a perspective view of one of many different examples of a filter arrangement embodying the invention.

Many different filter arrangements may implement these methods for moving a filter along a manifold assembly. One of numerous examples of a filter arrangement is shown in FIG. 1. The filter arrangement 10 of FIG. 1 generally comprises a filter 11 and a manifold assembly 12 having a manifold body 13 and a moveable shuttle assembly 14 mounted to the manifold body 13. Any of a great variety of filters may be associated with many different manifold assemblies. For example, U.S. Pat. Nos. 6,378,907 and 7,338,599 describe filters and associated manifold assemblies. U.S. patent application Ser. No. 14/068,692, which was filed on the same day as this patent application, is entitled FILTERS, and lists Mark William Foohey, Anthony William Gatica, Vincent Lam, Jacob Peter Vanderheyden, and Tatsuya Hoshino as inventors, also describes filters for use with manifold assemblies. Each is incorporated by reference to augment the teachings of filters and manifold assemblies in this specification.

Figure 2:
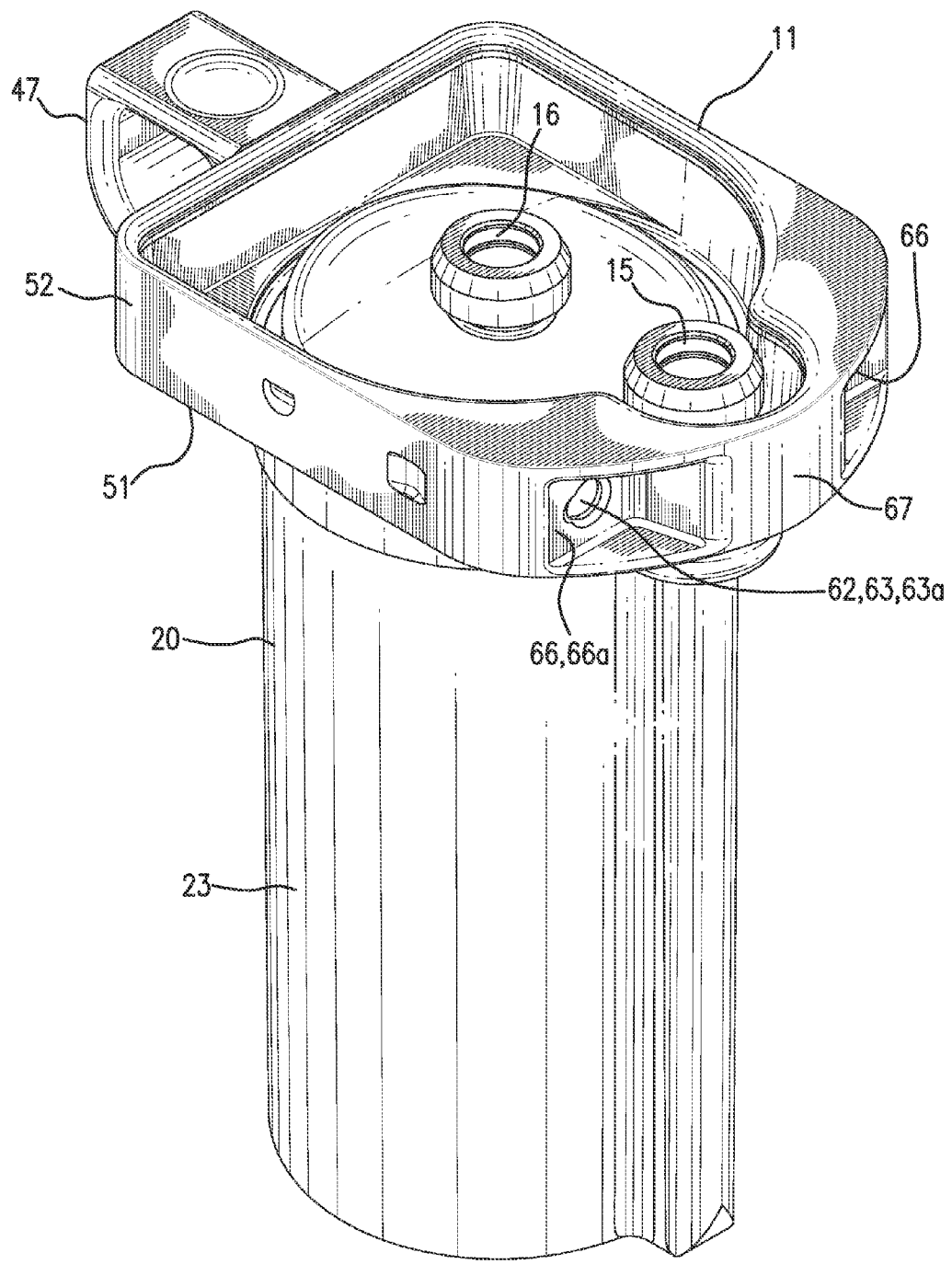
FIG. 2 is a perspective view of a filter which is part of the filter arrangement of FIG. 1.
Figure 3:
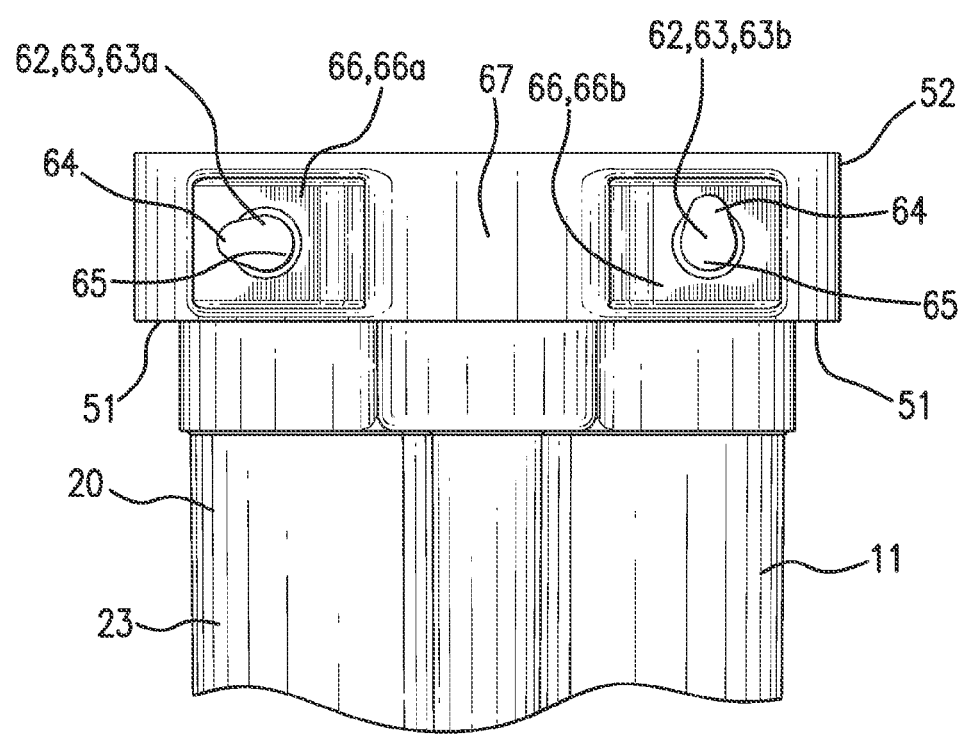
FIG. 3 is a partial end view of the filter of FIG. 2 showing a key portion on the filter.
Figure 4:
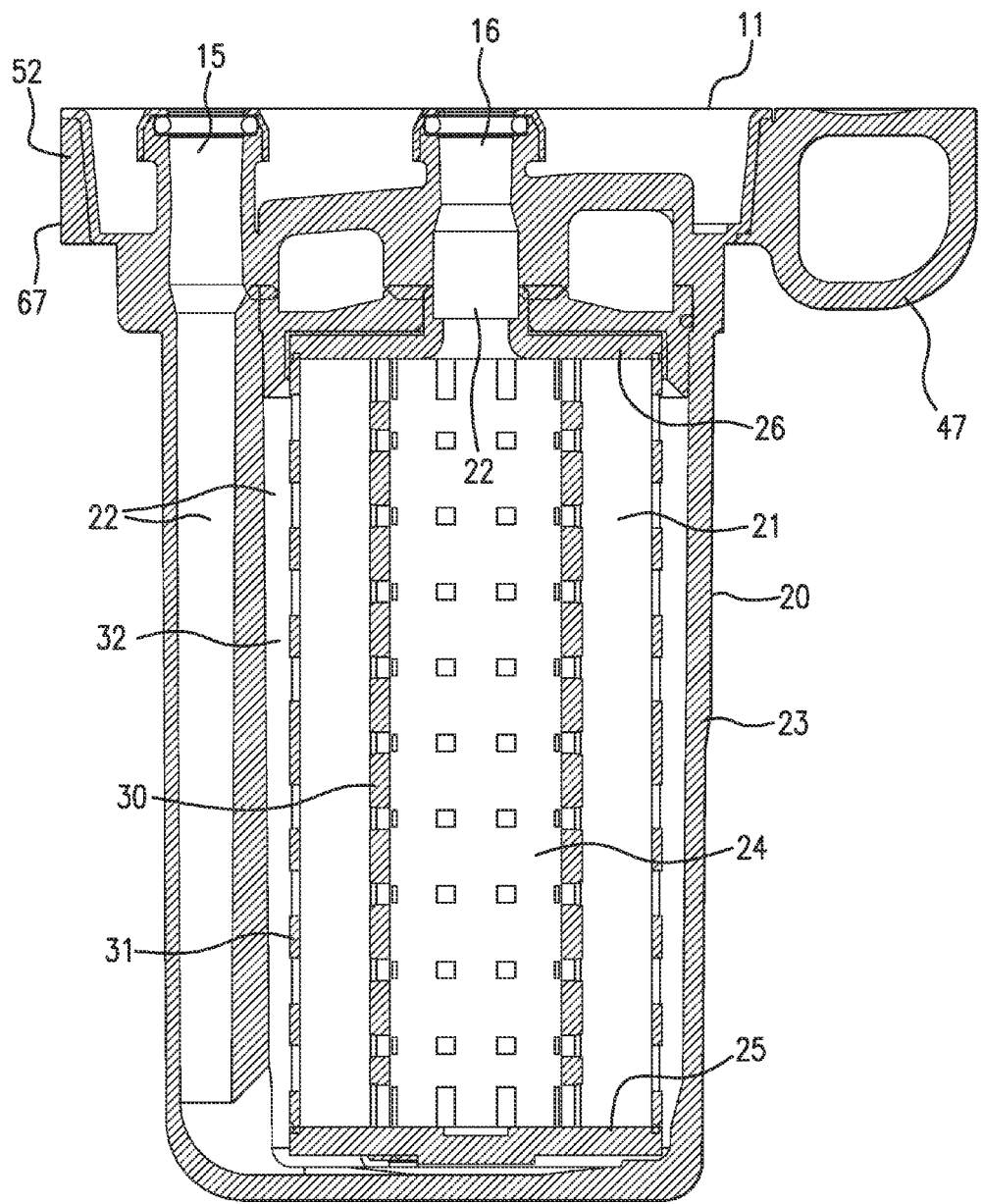
FIG. 4 is a cross sectional view of the filter of FIG. 2.

One of many examples of a filter 11 is shown in FIGS. 2-4. Generally, the filter 10 may include at least first and second fittings 15, 16, a housing 20, and a permeable filter medium 21. The first and second fittings 15, 16 may, for example, comprise an inlet fitting for feed or process fluid and an outlet fitting for filtrate or permeate, and the filter 10 may be arranged as a direct, dead-end, or barrier filter 10 in which all fluid entering the inlet fitting 15 passes through the filter medium 21 en route to the filtrate outlet fitting 16. For some embodiments, the filter may include different and/or additional fittings. For example, the filter may include a vent fitting for venting gas from the housing. Further, the filter may be arranged as a cross-flow filter in which only a portion of the fluid entering the inlet fitting passes through the filter medium to the filtrate outlet fitting, the remainder of the fluid exiting the filter via an additional retentate or concentrate outlet fitting. The fittings may be fashioned as any number of specific types of connectors and may be positioned at a variety of locations on the housing, e.g., on top of the housing. The housing 20 may define a fluid flow path 22 within the housing 20 between the first and second fittings 15, 16, may have any of a variety of shapes and styles, and may be fashioned from any of numerous impermeable materials, including metallic or polymeric materials.

The permeable filter medium 21 may be arranged in the fluid flow path 22 within the housing 20 to remove one or more substances from a fluid flowing along the fluid flow path. For example, the housing 20 may include a filter body 23 which may have a longitudinal axis A. The permeable filter medium 21 may be permanently or removably located in the fluid flow path 22 in the filter body 23. For some embodiments, the permeable filter medium 21 may form part of a filter element 24 that may be permanently or removably mounted in the housing 20, e.g., in the filter body 23. The filter element may be configured in a variety of ways. For example, the filter element 24 may include a blind end cap 25 and an open end cap 26. The filter medium 21 may extend between and may be bonded to the end caps 25, 26. The open end cap 26 may include one or more openings that fluidly communicate between the hollow interior of the filter medium 21 and one of the filter fittings 15, 16, e.g., the filtrate outlet fitting 16. A perforated core 30 and a perforated cage 31 may be positioned around the interior and the exterior of the filter medium 21 to support the filter medium 21 against laterally directed forces, e.g., forces, such as radial forces, directed generally perpendicular to the longitudinal axis A. The filter element 24 may be located in a filter chamber 32 within the housing 20, e.g., within the filter body 23, and the filter chamber 32 may form part of the fluid flow path 22 between the first and second fittings 15, 16. Fluid may be directed along the fluid flow path either outside-in or inside-out through the filter medium.

The filter medium may be configured in any of numerous ways. For example, the filter medium may comprise a pleated or spirally-wound permeable sheet having one or more layers, including a filter medium layer, one or more drainage and/or support layers, and/or a cushioning layer. Alternatively, the filter medium may comprise a bundle of permeable hollow fibers or a permeable mass, e.g., a hollow cylindrical permeable mass. The filter medium may be formed from any of numerous materials, including, but not limited to, any of various polymeric materials, and may be fashioned, for example, as a woven or nonwoven sheet, a mesh, or a mass of filaments or fibers. The filter medium may also be fashioned as a permeable membrane, e.g., in the form of a sheet or hollow fibers. The permeable filter medium may be porous, permeable, semipermeable, or permselective, and may have any of a wide range of removal ratings, e.g., from microporous or coarser to ultraporous, nanoporous, or finer. For some embodiments, different filters may have removal ratings of about 0.1 µm, 0.2 µm, 0.3 µm, 0.5 µm, 1 µm, and 5 µm.

The filter may also have a filtration characteristic, i.e., any of numerous parameters, such as physical, chemical, or fluid-related parameters, associated with the filter. Examples of filtration characteristics include, but are not limited to: removal or retention ratings for the filter medium, for example, in microns or nanometers; molecular weight cut-offs for the filter medium, for example, in Daltons; the type of material from which the filter, e.g., the housing or the permeable filter medium, is fashioned, including, for example, a metallic material, such as stainless steel, or a polymeric material, such as polypropylene, polyethylene, polyamide, PVDF, PES, or PVA; the surface area of the filter medium, for example, in $cm^2$ or $m^2$; the type of fluid to be filtered by the filter, including, for example, water, CMP slurry, etchants, or solvents; a flow rate or pressure drop, including a maximum, nominal, or minimum flow rate or pressure drop, associated with the filter; the type of connector formed by the fittings; or the wettability of the filter medium, including the phobicity, e.g., the hydrophobicity, or the philicity, e.g., the hydrophilicity, of the filter medium. Any of the filtration characteristics may be a feature useful for distinguishing one filter from another filter and/or for selecting a particular filter for use with a particular manifold assembly and/or a particular fluid to be filtered.

Figure 5:
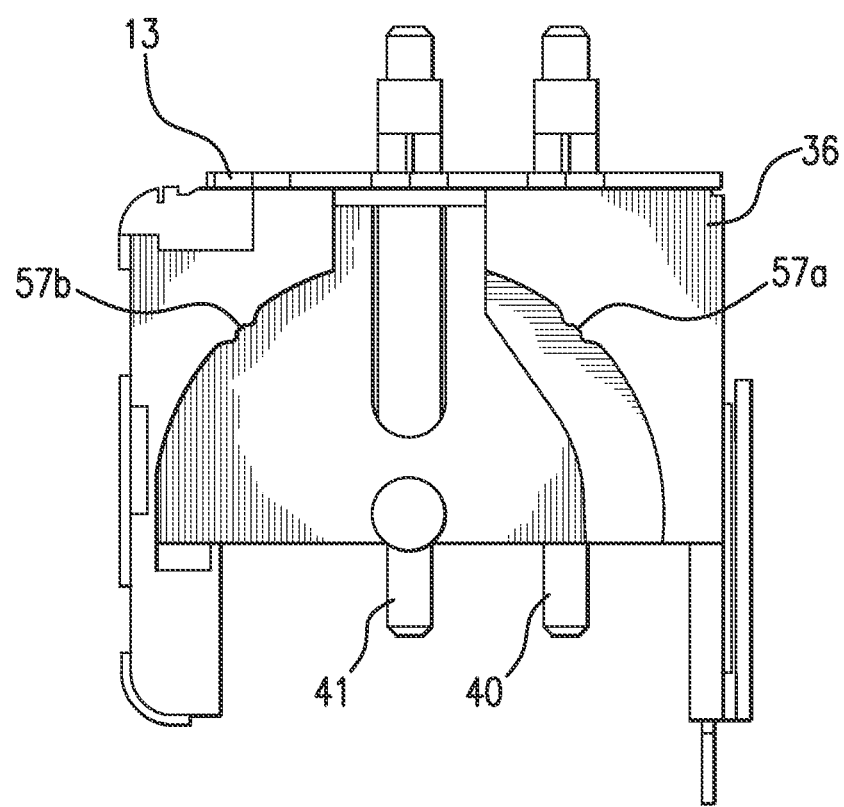
FIG. 5 is a side view of a manifold body.

The manifold assembly may also be configured in a great variety of ways. The manifold assembly may include a body, and the manifold body may be variously structured. The manifold body may have any regular or irregular shape, e.g., a boxy shape, and may support at least the first and second fittings of the manifold assembly. For example, in the illustrated embodiment in FIGS. 1 and 5, the manifold body 13 may include front, top, and opposite side plates 33, 34, 35 connected to an inner shell 36 which may support the first and second manifold fittings 40, 41. The first and second manifold fittings 40, 41 may extend through the inner shell 36 and may be coupled at one end, e.g., the upper end, to a larger system (not shown) and, at the other end, e.g., the lower end, may be sealingly engageable with the first and second filter fittings 15, 16, respectively. One of the manifold fittings, e.g., the first fitting 40, may comprise a feed or process fluid fitting for supplying feed or process fluid from the larger system to the inlet fitting 15 of the filter 11, while the other manifold fitting, e.g., the second fitting 41, may comprise a filtrate or permeate fitting for returning filtered fluid from the outlet fitting 16 of the filter 11 to the larger system. The fittings of the manifold, like the fittings of the filter, may be fashioned as any number of specific types of connectors. For example, one of the manifold assembly fittings and filter fittings, e.g., each manifold fitting 40, 41, may comprise a nozzle, while the other of the manifold assembly fittings and filter fittings, e.g., each filter fitting 15, 16, may comprise a receptacle which receives the nozzle. Various sealing arrangements, e.g., an O-ring, a gasket, and/or a face seal, may be used to seal the engaged receptacle and nozzle. For some embodiments, the manifold body may include different and/or additional fittings, including, for example, a vent discharge fitting coupleable to a vent fitting of the filter and/or a retentate discharge fitting coupleable to a retentate outlet fitting of the filter. Further, valves may be associated with some or all of the manifold fittings to control fluid flow through the fittings. The valves may be mounted to the manifold assembly, e.g., to the manifold body, or may be external to the manifold assembly, e.g., may be part of the larger system.

The manifold assembly may also include a moveable shuttle assembly, and the shuttle assembly may have any number of different configurations. For some embodiments, including the embodiment shown in FIGS. 1 and 6-8, the shuttle assembly 14 may include a carriage assembly 42 and an actuator mechanism 43 coupled to the carriage assembly 42. Either or both of the carriage assembly 42 and the actuator mechanism 43 may be coupled to the manifold body 13. The carriage assembly 42, which receives the filter 11, may move the filter fittings 15, 16 into and/or out of engagement with the manifold fittings 40, 41 in response to movement of the actuator mechanism 43. In other embodiments, the moveable shuttle assembly may comprise a carriage assembly coupled to the manifold body without an actuator mechanism. For example, the carriage assembly may be hinged to the manifold body. The carriage assembly may then move the filter fittings into and/or out of engagement with the manifold fittings by directly pivoting the carriage assembly.

The carriage assembly may be variously configured. As one of many examples, the carriage assembly 42 may include a carriage 44 and one or more, e.g., two, lifts 45 attached to and extending beyond, e.g., upwardly from, the carriage 44, as shown, for example, in FIGS. 6-9 and 13. Each lift 45 may be mounted in a track which extends longitudinally along the inside of the inner shell 36 of the manifold body 13, the tracks limiting the movement of the lifts 45 to longitudinal movement, e.g., up and down, along the tracks. The carriage and the filter may be configured in any of numerous ways to allow the carriage to receive and support the filter for movement. As one of many examples, the illustrated carriage 44 may have an open end 46 which receives the filter 11 and shelves 50 in the interior on both sides of the carriage 44 for supporting the filter 11. The filter may include ledges on the housing which slide along and rest on the shelves of the carriage. For example, ledges 51 may be provided on the underside of a flange 52 located in an upper region of the filter housing 20, e.g., on top of the filter body 23, as shown in FIGS. 2 and 3. The filter may be positioned on the moveable shuttle assembly in a variety of ways. For example, the filter 11 may be inserted in the carriage 44 by sliding the flange 52 into the open end 46 of the carriage 44, the ledges 51 of the flange 52 sliding along and being supported by the shelves 50. The housing 20 of the filter 11 may include a finger hold 47 to facilitate inserting, and withdrawing, the filter 11 into or out of the carriage 44. The top of the flange 52 may be positioned close to the top of the carriage 44. When the shuttle assembly 14 moves the filter fittings 15, 16 into or out of engagement with the manifold fittings 40, 41, the shelves 50 of the carriage 44 may exert an upward force on the ledges 51 of the filter 11 to engage the fittings 15, 16, 40, 41 and the top of the carriage 44 may exert a downward force on the top of the flange 52 to disengage the fittings 15, 16, 40, 41.

Once the filter is positioned on the carriage assembly, the actuator mechanism may be actuated to move the filter on the carriage assembly and engage or disengage the filter fittings and the manifold fittings. For example, the actuator mechanism may be moved from a first position to a second position. In response to this movement, the carriage assembly and any filter on the carriage assembly may be moved from a first position, wherein the filter fittings are spaced from and disengaged with the manifold fittings, to a second position, wherein the filter fittings sealingly engage the manifold fittings. To disengage the filter fittings from the manifold fittings, the actuator mechanism may be moved from the second position to the first position, thereby moving the carriage assembly and the filter from the second position, wherein the filter fittings sealingly engage the manifold fittings, to the first position, wherein the filter fittings are spaced from and disengaged with the manifold fittings. For some embodiments, including the illustrated embodiment, the carriage assembly and the actuator mechanism may be arranged to move the filter fittings linearly and coaxially with respect to the manifold fittings the entire distance that the fittings travel between the first position and the second position of the carriage assembly. For other embodiments, the filter fittings and the manifold fittings may move in a different manner, e.g., an arcuate manner relative to one another between the first and second positions.

The actuator mechanism may be variously configured to move the carriage assembly. For example, the actuator mechanism may comprise a threaded arrangement or a cammed arrangement that may move the carriage assembly between the first and second positions in response to movement of the actuator mechanism. For some embodiments, the actuator mechanism may comprise a pivotable lever arrangement that may be pivoted between first and second positions to move the carriage assembly between the first and second positions.

Figure 6:
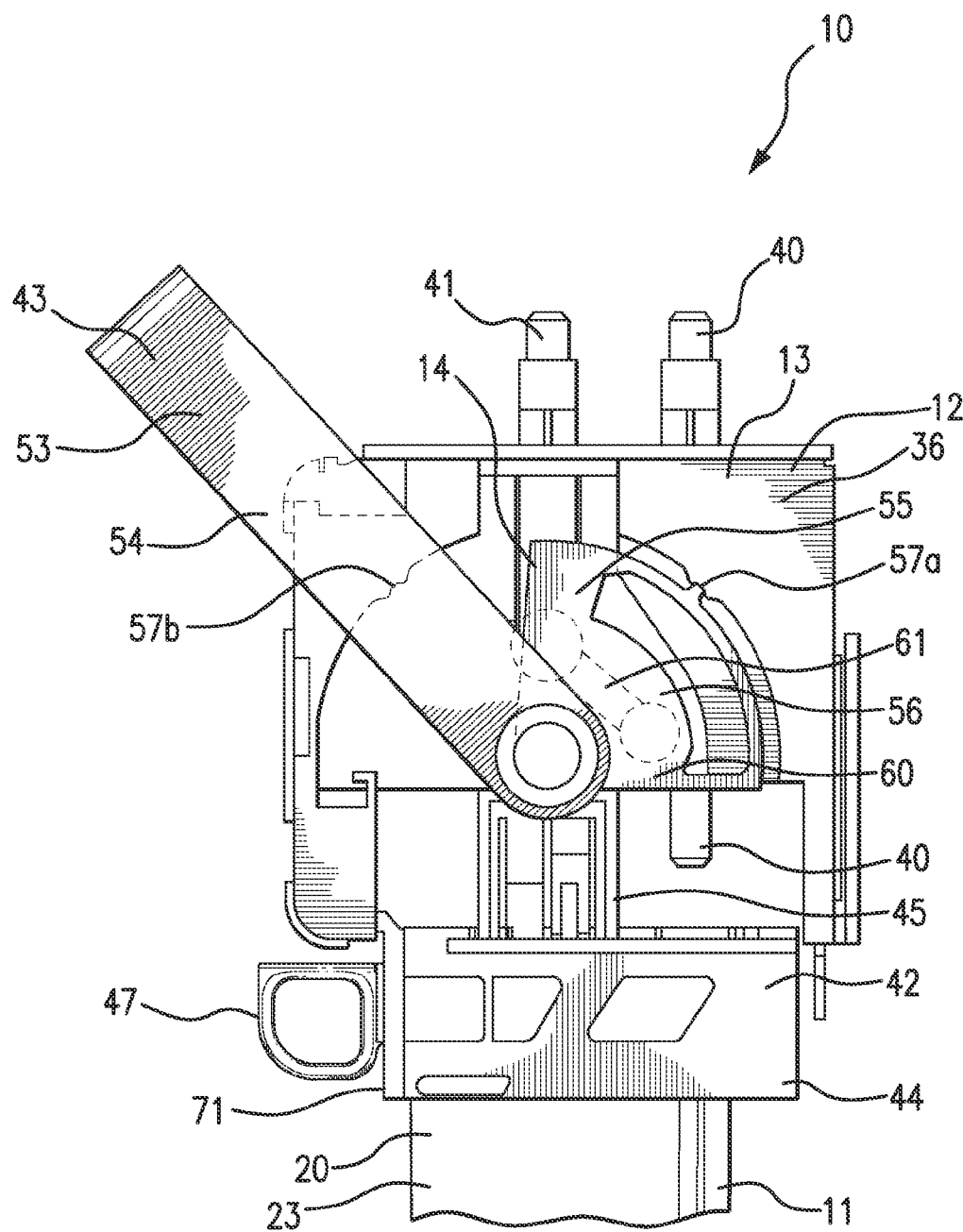
FIG. 6 is a side view of the shuttle assembly mounted to the manifold body of FIG. 5.
Figure 7:
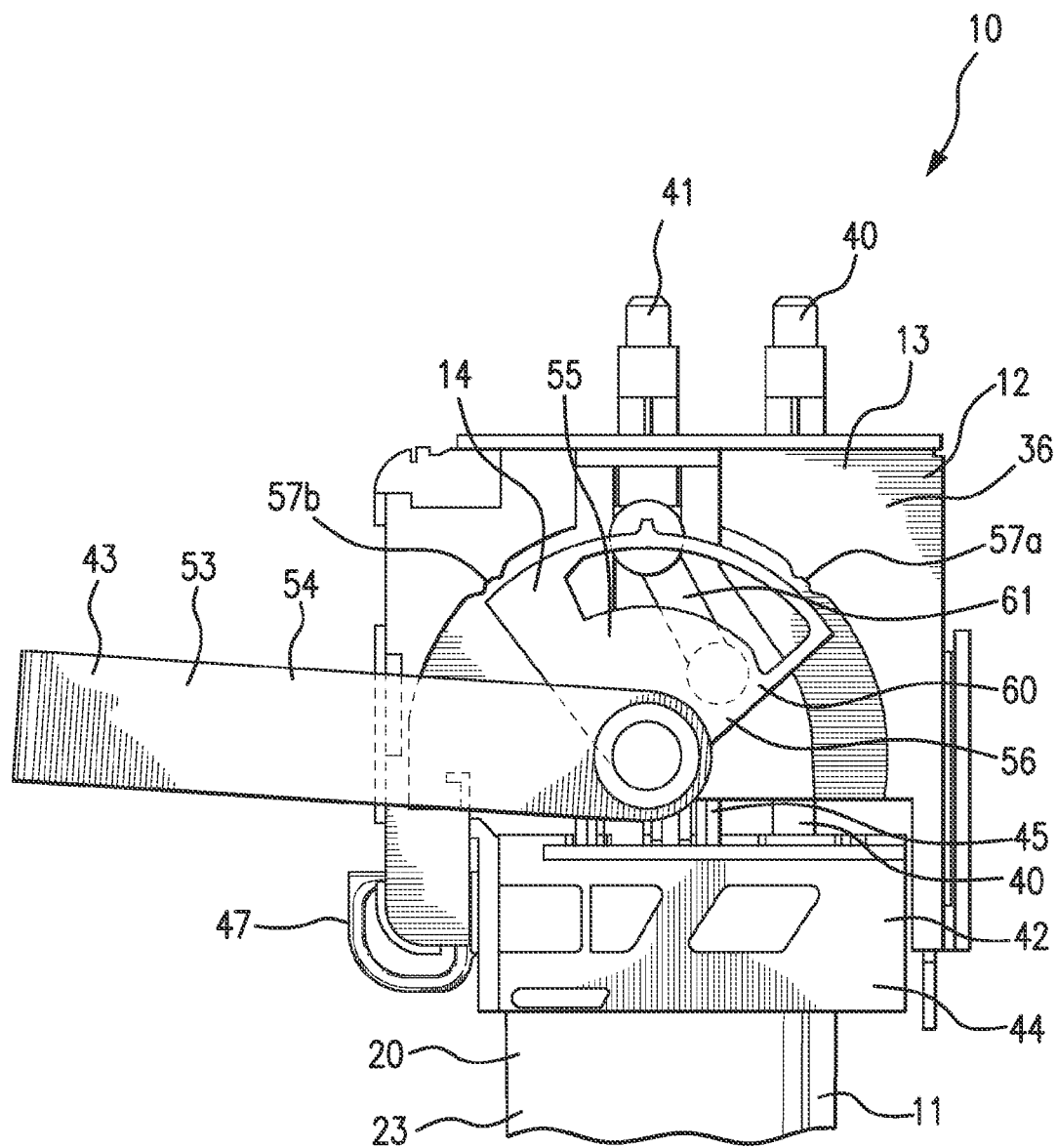
FIG. 7 is another side view of the shuttle assembly mounted to the manifold body of FIG. 5.
Figure 8:
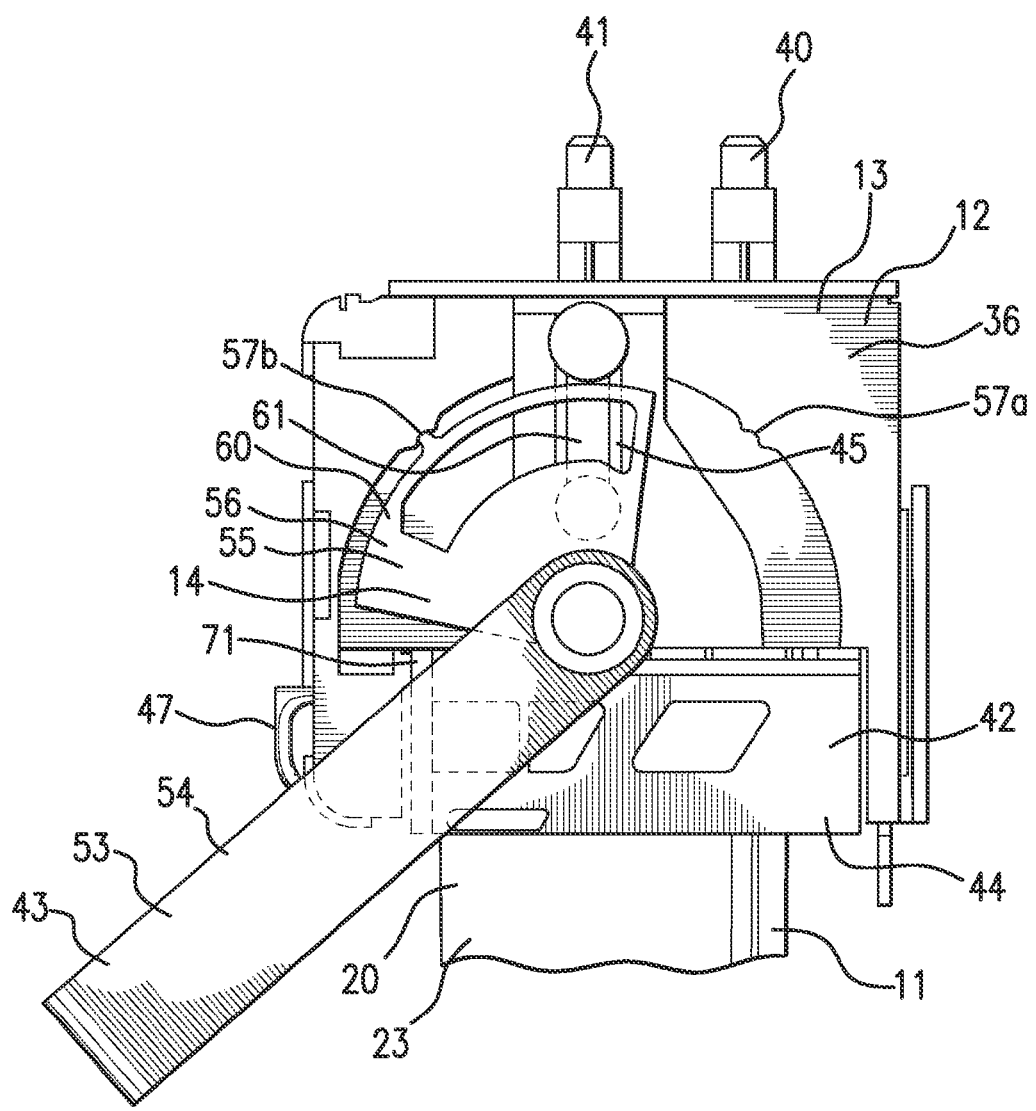
FIG. 8 is still another side view of the shuttle assembly mounted to the manifold body of FIG. 5.
Figure 9:
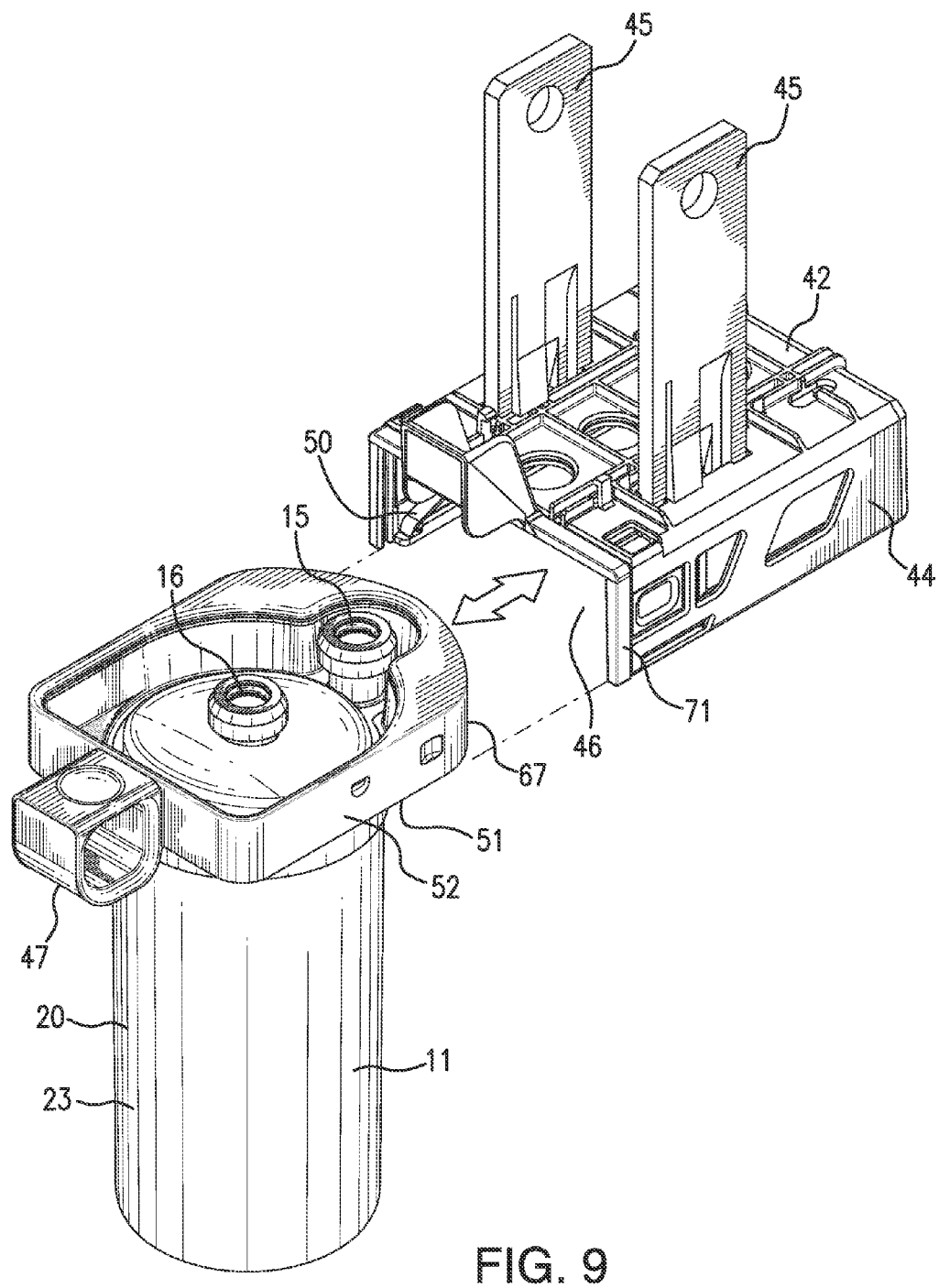
FIG. 9 is a perspective view of a carriage assembly including a carriage and a filter poised at an open end of the carriage.

The pivotable lever arrangement may be configured in numerous ways. For example, the actuator mechanism 43 may comprise a pivotable lever arrangement 53 which, as shown in FIGS. 6-8, may include a pivotable lever 54 mounted, for example, to the manifold body 13 and a linkage 55 linking the pivotable lever 54 to the carriage assembly 42. Both the pivotable lever and the linkage may be configured in a variety of ways. In the illustrated embodiment, the pivotable lever 54 may comprise a handle, e.g., a U-shaped handle. Each end of the U-shaped handle 54 may be pivotably mounted to the manifold body 13, e.g., to the inner shell 36, and the handle 54 may be pivoted about a pivot axis P between a first position, e.g., a 10:30 position as shown in FIG. 6, and a second position, e.g., a 7:30 position as shown in FIG. 8. The linkage 55 may, for example, comprise a crank assembly 56 coupled between the handle 54 and the carriage assembly 42 on each side of the manifold body 13, e.g., on each side of the inner shell 36. For some embodiments, each crank assembly 56 may include a crank link 60 which pivots with the handle 54. For example, the crank link 60 may be fixedly mounted to an end of the handle 54 at the pivot axis P, the crank link 60 pivoting with the handle 54 about the pivot axis P between the first and second positions. The handle 54, along with the remainder of the actuator mechanism 43, may be held in the first and second positions by detents 57a, 57b mounted, for example, between the inner shell 36 and the crank link 60. Each crank assembly 56 may further include a slider link 61 rotatably mounted at one end to a fixed location on a lift 45. For example, one end of the slider link 61 may be rotatably mounted within an aperture in an upper region of the lift 45. The other end of the slider link 61 may be rotatably mounted to a fixed location on the crank link 60 off set or spaced from the pivot axis P. As the handle 54 pivots between the first position and the second position, the crank links 60 on each side of the inner shell 36 also pivot between a first position and a second position, as shown in FIGS. 6-8. Pivoting the crank links 60 between the first and second positions moves the slider links 61 which, in turn, drives the lifts 45 longitudinally, e.g., up or down, along the tracks of the inner shell 36. The lifts 45, in turn, move the carriage 44 and any filter 11 on the carriage 44 longitudinally, e.g., up or down, engaging or disengaging the filter fittings 15, 16 and the manifold fittings 40, 41. Thus, moving the actuator mechanism 43 from a first position to a second position, e.g., pivoting the lever or handle 54 from a first position to a second position, moves the carriage assembly 42 and any filter 11 in the carriage assembly 42 from a first position, in which the carriage 44 is spaced from the manifold body 13 and the filter fittings 15, 16 are spaced from the manifold fittings 40, 41, to a second position, in which the carriage 44 is nestled closer to the manifold body 13 and the filter fittings 15, 16 are sealingly engaged with the manifold fittings 40, 41. Similarly, moving the actuator mechanism 43 from the second position to the first position, e.g., pivoting the lever or handle 54 from the second position to the first position, moves the carriage assembly 42 and any filter 11 on the carriage assembly 42 from the second position, in which the carriage 44 is nestled closer to the manifold body 13 and the filter fittings 15, 16 are sealingly engaged with the manifold fittings 40, 41, to the first position, in which the carriage 44 is spaced from the manifold body 13 and the filter fittings 15, 16 are spaced from the manifold fittings 40, 41.

Filter arrangements embodying the invention may further comprise a keying mechanism which includes a key portion on the filter and a key portion on the shuttle assembly. The key portion on the filter may have a configuration, e.g., a shape, size, orientation and/or location, that corresponds to a particular one of any of the filtration characteristics previously described for a filter. All filters having a particular filtration characteristic, for example, a particular removal rating, such as 0.5 µm, may have a key portion with the same configuration. Filters having different filtration characteristics, e.g., removal ratings different from 0.5 µm, may have different key portion configurations, each corresponding to a different filtration characteristic.

The key portion on the shuttle assembly may have a configuration, e.g., a shape, size, orientation and/or location, that both corresponds to a particular filtration characteristic of a filter and is mateable only with the configuration of the key portion of the filter. The requirements for a specific system may dictate a filter with a particular filtration characteristic, and the shuttle assembly may be arranged to have a key portion with a configuration that corresponds to that particular filtration characteristic. Then, only filters having that particular filtration characteristic may be seated on the shuttle assembly, i.e., fully positioned on the shuttle assembly with the key portions of the filter and shuttle assembly mated to one another. For example, a specific system may require a filter having a removal rating of 0.5 µm or may require a nylon filter medium. The shuttle assembly may be arranged with a key portion configuration that corresponds to a 0.5 µm removal rating or corresponds to a nylon filter medium. Then, only filters having a removal rating of 0.5 µm and a key portion configuration that corresponds to the 0.5 µm removal rating, or only filters having a nylon filter medium and a key portion corresponding to the nylon filter medium, may be seated on the shuttle assembly because only a filter having a key portion configuration that corresponds to the 0.5 µm removal rating, or the nylon filter medium, can be mated to the key portion configuration of the shuttle assembly. Filters having different removal ratings, or filter media formed from different materials, may have key portions with different configurations corresponding to the different removal ratings, or the different filter medium materials. These filters can not be seated on the shuttle assembly because the different key portion configurations of those filters can not be mated to the key portion configuration of the shuttle assembly.

The key portions may be structured in a myriad of ways and their configurations may have any of numerous shapes, sizes, orientations, and/or locations. For example, mating key portions on the filter and the shuttle assembly may comprise one or more projections and one or more recesses, the configurations of which may have a shape, size, orientation, and/or location that allows the projections to matingly fit in the recesses. As another example, mating key portions may comprise interfitting projections, the configurations of which may have a shape, size, orientation, and/or location that allows the projections to matingly fit together.

As one of many different examples, the keying mechanism 62 on the filter 11 and shuttle assembly 14 may comprise key portions 63 structured as projections and recesses which matingly receive the projections, as shown in FIGS. 3 and 10-12. The key portion 63 on the filter 11 may, for example, comprise a recess, while the key portion 63 on the shuttle assembly 14 may comprise a projection, or vice versa. The key portions may have configurations with any of a variety of shapes, including, for example, a generally tear-drop shape having a narrower region 64 on one end and a wider region 65 on the other end.

The key portion 63 on the filter 11 may be located in a region of the filter 11 that interacts with the shuttle assembly 14, including, for example, an upper region of the filter housing 20. For some embodiments, the key portion 63 may be located on the flange 52 of the housing 20. In the illustrated embodiment, the key portion 63 may be located in an inset 66 in an outwardly-facing wall 67 of the flange 52. For some embodiments, the key portion 63 on the filter 11 may include a plurality, e.g., two, key elements 63a, 63b. The key elements 63a, 63b may each comprise a recess. The key elements 63a, 63b may be respectively located, for example, in insets 66a, 66b on opposite sides of the outwardly-facing wall 67 of the flange 52. The configurations of the key elements 63a, 63b may or may not have the same shape, size, and/or orientation. In the illustrated embodiment, both key elements 63a, 63b may have the same tear-drop shape and size but a different orientation. For example, for one key element 63a the narrower region 64 may be at the 9:00 position and for the other key element 63b the narrower region 64 may be at the 12:00 position. Alternatively, both key elements may have the same orientation or may have different shapes or different sizes.

The combination of the configurations of the key elements may define the configuration of the key portion of the filter, and this configuration may correspond to a particular one of any of the previously described filtration characteristics of the filter. For example, the filter 11 shown in FIG. 3 may have a removal rating of, say, 0.1 µm. The combination of the configurations of the key elements 63a, 63b of the filter 11 shown in FIG. 3 may define the configuration of the key portion 63 of the filter 11 and may correspond to the removal rating of 0.1 µm. Filters having that particular filtration characteristic, e.g., a removal rating of 0.1 µm, may have a key portion, e.g., key elements, with the same key portion configuration, e.g., the same combination of key element configurations, including shapes, sizes, orientations, and locations, as the filter 11 shown in FIG. 3. Filters having different filtration characteristics, e.g., different removal ratings, may have key portions, e.g., key elements, with different key portion configurations, e.g., different combinations of key element configurations. For example, the filter 11 shown in FIG. 11 may have a different filtration characteristic, e.g., a removal rating of, say, 0.3 µm. The key portion 63, e.g., the key elements 63a, 63b, of the filter 11 shown in FIG. 11 may have a different key portion configuration, e.g., a different combination of key element configurations. For example, the key elements 63a, 63b of the filter 11 shown in FIG. 11 may comprise recesses with configurations having the same shape, size, and location as those of the filter 11 of FIG. 3 but a different orientation. In the illustrated embodiment, the narrower region 64 of both key elements 63a, 63b of the filter 11 shown in FIG. 11 may be oriented toward the 12:00 position. This key portion configuration may correspond to the removal rating of 0.3 µm, while the key portion configuration of the filter 11 shown in FIG. 3 may correspond to the removal rating of 0.1 µm. In this manner, the configuration of the key portion of a filter, e.g., the combination of the configurations of the key elements of the filter, may uniquely correspond to any particular filtration characteristic of the filter.

The key portion on the shuttle assembly may also have a configuration, e.g., a shape, size, orientation, and/or location, that corresponds to a particular one of any of the previously described filtration characteristics, where the particular filtration characteristic may be dictated by the requirements of a specific system. Further, the key portion on the shuttle assembly may be structured to mate with the key portion on a filter 11 having the particular filtration characteristic dictated by the system when the filter is seated on the shuttle assembly, i.e., is fully positioned on the shuttle assembly with the key portions of the filter and shuttle assembly mated to one another.

Figure 10:
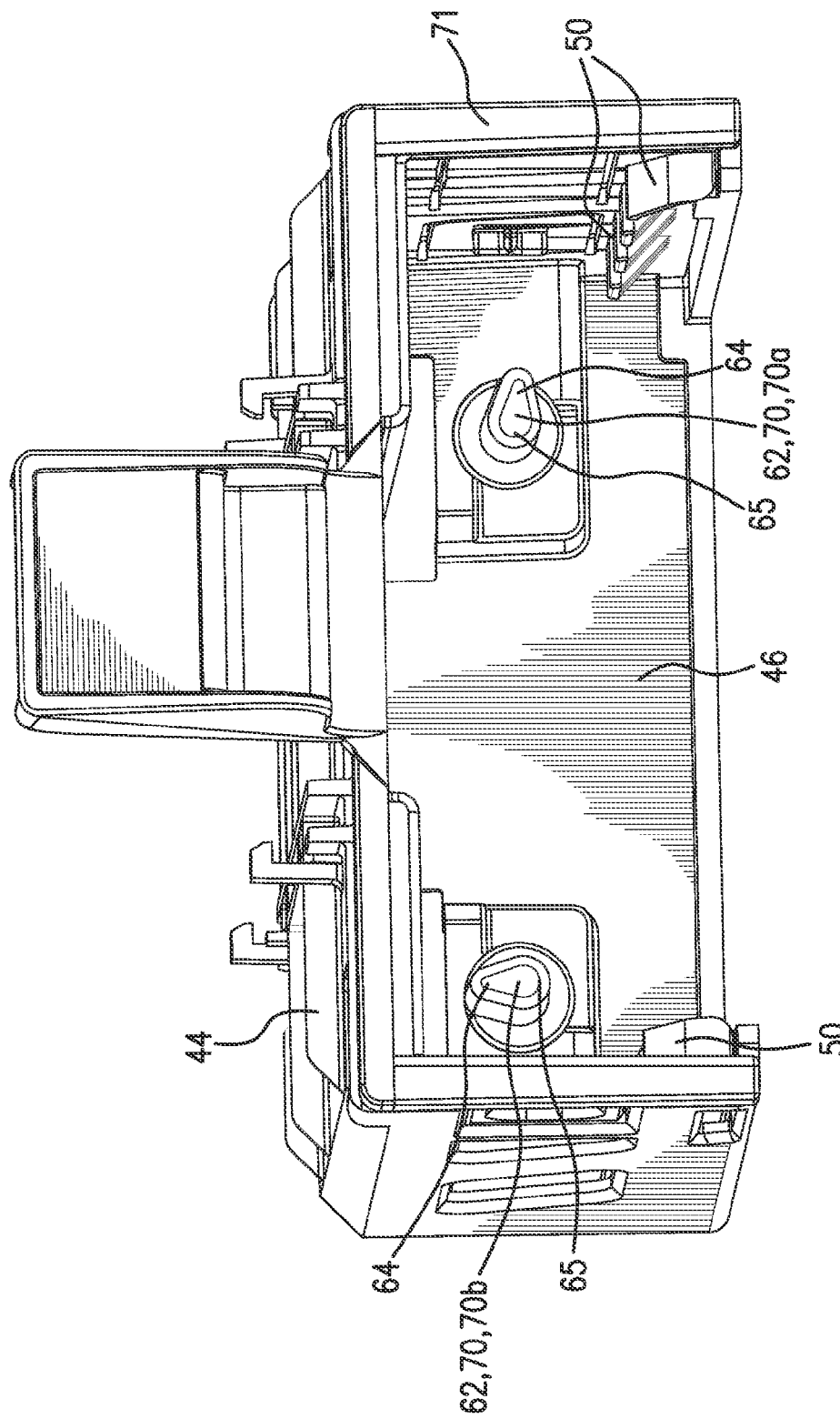
FIG. 10 is a perspective view of the carriage of FIG. 9 showing a key portion on the carriage.
Figure 11:
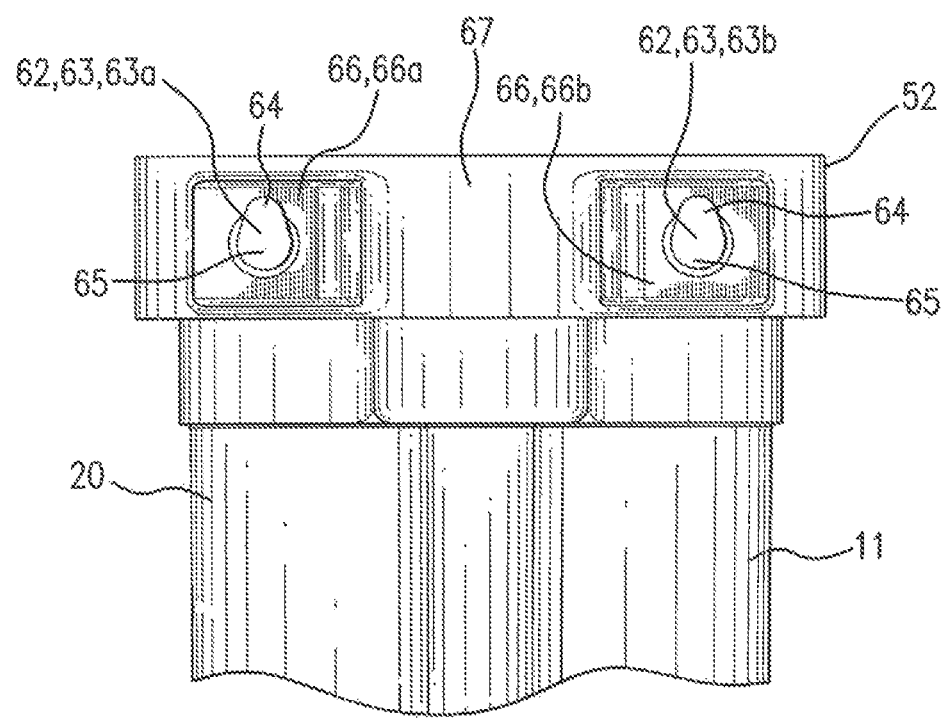
FIG. 11 is a partial end view of another filter showing a different key portion on the filter.

For example, the carriage 44 of the shuttle assembly 14 shown in FIG. 10 may be arranged with a key portion 70, and the key portion 70 may be formed as a projection. The key portion 70 may have a configuration that corresponds to, say, a removal rating of 0.1 µm and mates with a filter key portion formed as a recess and having a configuration that also corresponds to a removal rating 0.1 µm, such as the key portion 63 of the filter 11 shown in FIG. 3. In this example, the key portion 70 of the carriage 44 shown in FIG. 10 may comprise two key element projections 70a, 70b in the interior of the carriage 44, e.g., in a rear portion of the carriage 44, located to mate with the key element recesses 63a, 63b of the filter 11 shown in FIG. 3 when the filter 11 is seated in the carriage 44. Thus, the configurations of the key elements 70a, 70b on the carriage 44 may include a corresponding location, a corresponding tear-drop shape, and a size similar to the key elements 63a, 63b on the filter. Further, the configurations of the key elements 70a, 70b on the carriage 44 may include an orientation with the narrow region 64 of one key element 70a positioned at 3:00 and the narrow region 64 of other key element 70b positioned at 12:00. Then, only filters having key portion configurations corresponding to the desired filtration characteristic, e.g., a removal rating of 0.1 μm, such as the key portion 63, e.g., the key elements 63a, 63b, of the filter 11 shown in FIG. 3, may be seated in the shuttle assembly 14, e.g., the carriage 44, of FIG. 10. Other filters having different filtration characteristics and, therefore, different key portion configurations, such as the filter 11 shown in FIG. 11, may not be seated on the shuttle assembly 14, e.g., the carriage 44, of FIG. 10 because the key portions of those filters will not mate with key portion 70, e.g., the key elements 70a, 70b, of the shuttle assembly 14, e.g., the carriage 44, of FIG. 10.

Moving a filter along a manifold assembly may thus include selecting a filter having a particular filtration characteristic and a key portion having a configuration that corresponds to that particular filtration characteristic from among a plurality of filters having different filtration characteristics and different key portion configurations. The selected filter may then be seated on a shuttle assembly having a key portion with a configuration that corresponds to the particular filtration characteristic and is mateable with the key portion configuration of the filter.

Figure 12:
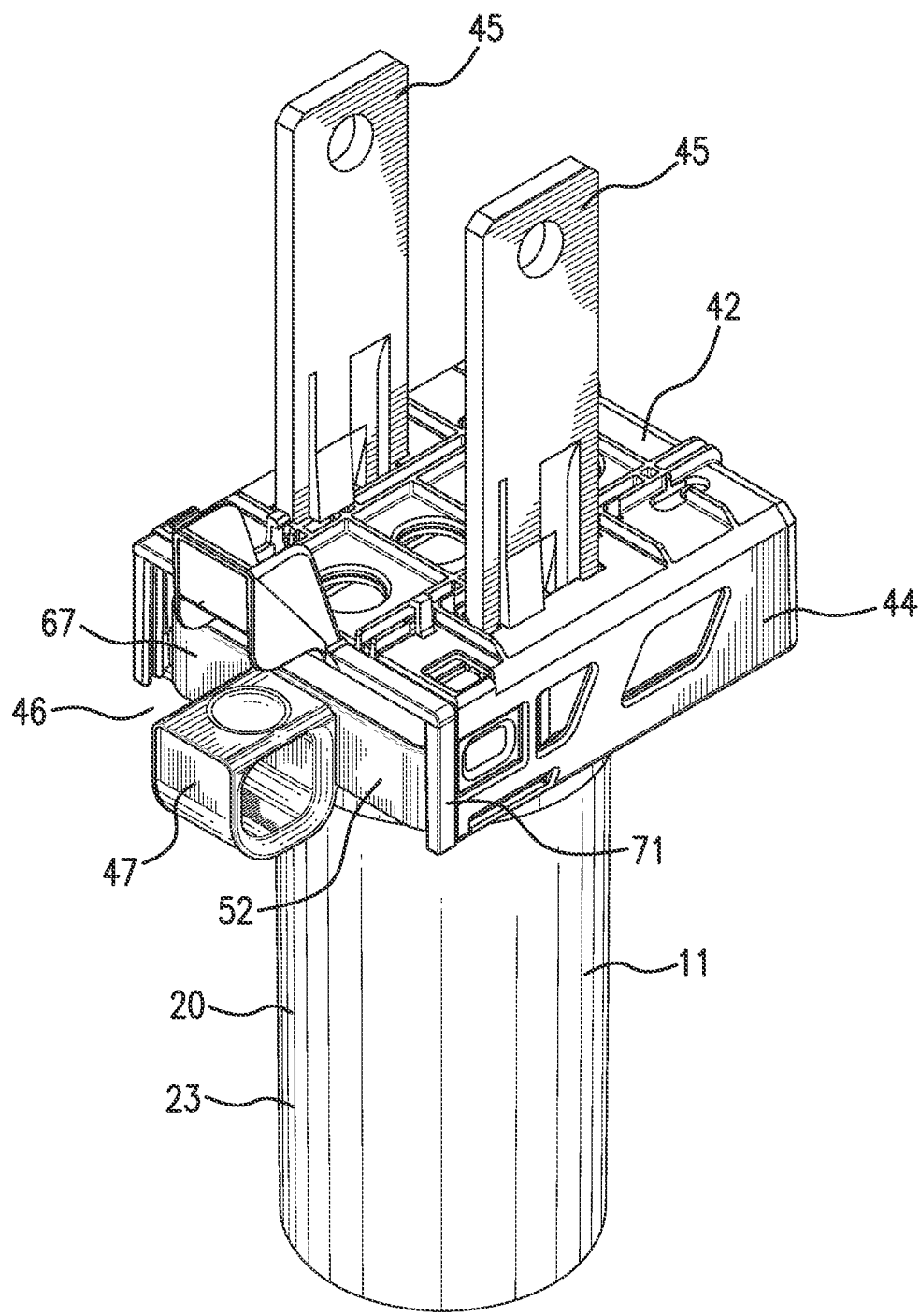
FIG. 12 is a perspective view of the filter and carriage assembly of FIG. 9 showing the filter seated on the carriage assembly.

Seating a filter on the shuttle assembly includes fully positioning the filter on the shuttle assembly and mating the key portions of the filter and shuttle assembly. For many, but not all, embodiments seating the filter on the shuttle assembly may include positioning the filter on a carriage assembly, for example, on a carriage, and mating the key portions of the filter and the carriage. For example, in the illustrated embodiment, seating the filter 11 on the carriage 44 may including sliding the flange 52 of the filter 11 into the open end 46 of the carriage 44 with the key portion 63, e.g., the key elements 63a, 63b, of the filter 11 facing the key portion 70, e.g., the key elements 70a, 70b, of the carriage 44. The ledges 51 of the filter flange 52 may ride along the carriage shelves 50 as the filter 11 is slid back along the carriage 44. Toward the back of the carriage 44, the key portion 63, e.g., the key elements 63a, 63b, of the filter 11 encounter the key portion 70, e.g., the key elements 70a, 70b, of carriage 44. When the configurations of the key portions 63, 70, e.g., the key elements 63a, 63b, 70a, 70b, of the filter 11 and the carriage 44 both correspond to the particular filtration characteristic, the key portions 63, 70, e.g., the key elements 63a, 63b, 70a, 70b, mate with one another as the filter 11 is fully positioned, e.g., slid all of the way into, the carriage 44, as shown in FIG. 12. For example, the key element projections 70a, 70b of the carriage 44 may enter the key element recesses 63a, 63b of the filter 11. When the filter 11 is fully positioned on the carriage 44 with the key portions 63, 70 mated to one another, the filter 11, e.g., the flange 52, may contact a rear portion of the carriage 44, e.g., a rear wall of the carriage 44, which functions as a stop limiting further rearward movement of the filter 11 in the carriage 44. The filter 11 is then seated on the moveable shuttle assembly 14, e.g., the carriage 44. For many embodiments, when the filter 11 is seated on the shuttle assembly 14, the filter fittings 15, 16 may be axially aligned with the respective manifold fittings 40, 41.

Any attempt to seat a filter not having the particular filtration characteristic on the shuttle assembly, e.g., the carriage, will be ineffective. Any filter having a different filtration characteristic will have a different key portion configuration, e.g., different key element configurations, one which will not mate with the configuration of the key portions, e.g., the key elements, on the shuttle assembly. Consequently, a filter having a different filtration characteristic will not seat properly on the moveable shuttle assembly, preventing the filter fittings and the manifold fittings from moving into sealing engagement. For some embodiments, including the illustrated embodiment, if the filter is not seated, e.g., not fully positioned on the shuttle assembly with the key portions mated to one another, the filter may hang out of the open end of the carriage and/or the fittings of the filter and manifold assembly may be misaligned. The moveable carriage assembly may then be prevented from moving to the second position, for example, because the overhanging filter may contact the bottom of the front edge of the manifold body before the carriage reaches the second position and/or because the misaligned filter and manifold fittings may not properly engage one another.

With the filter having the appropriate filtration characteristic seated on the shuttle assembly, the manifold assembly fittings and the filter fittings may be sealingly engaged by moving the shuttle assembly from the first position to the second position as previously described. For some embodiments, when the filter is seated on the shuttle assembly, the filter fittings may be aligned with the fittings of the manifold assembly. Moving the shuttle assembly from the first position to the second position may then include moving the filter fittings linearly and coaxially into sealing engagement with the manifold assembly fittings.

Disengaging the filter and manifold assembly fittings may include moving the shuttle assembly from the second position to the first position, as previously described. The filter may then be unseated from the shuttle assembly by decoupling the mated key portions, e.g., the key elements, of the filter and shuttle assembly. For example, the filter 11 may be pulled back through the open end 46 of the carriage 44, removing the key element projections 70a, 70b of the carriage 44 from the key element recesses 63a, 63b of the filter 11. The ledges 51 of the filter 11 may slide along the shelves 50 of the carriage 44 until the filter 11 exits the open end 46 of the carriage 44. A new or cleaned filter may then be seated on the shuttle assembly and the shuttle assembly may be moved from the first position to the second position to sealingly engage the fittings of the new or cleaned filter and the manifold assembly fittings.

Figure 13:
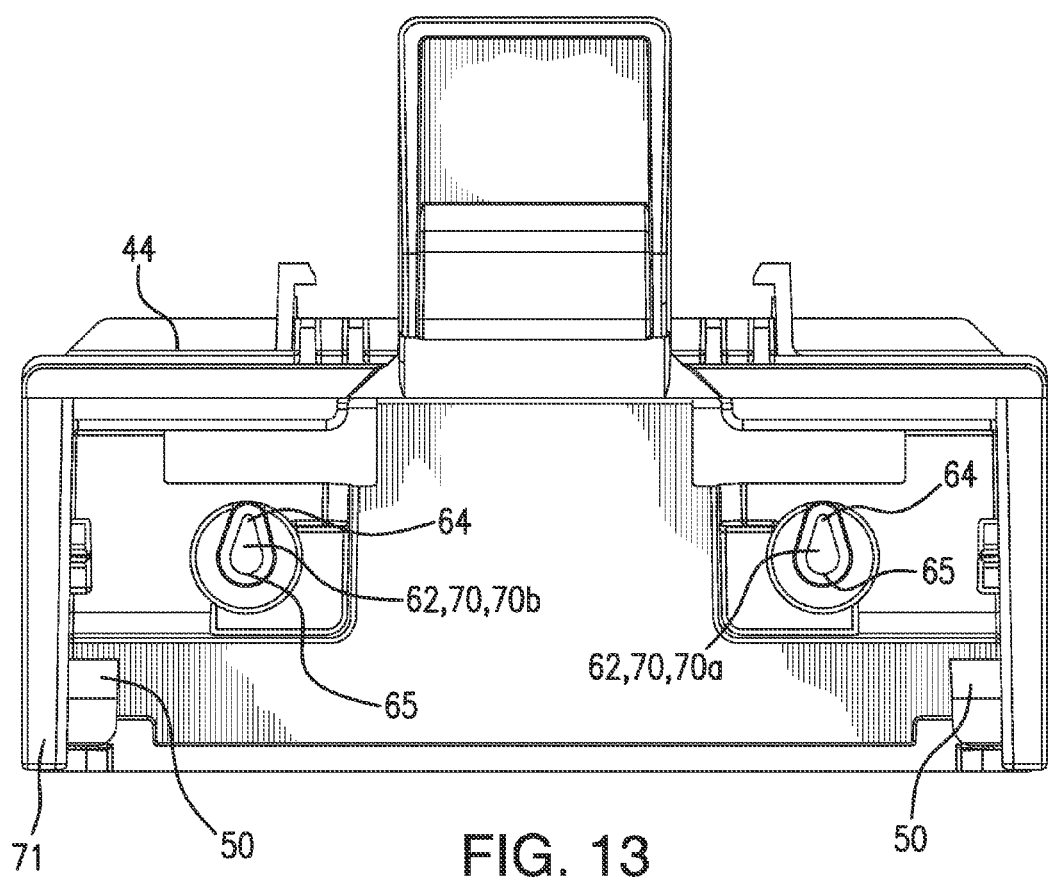
FIG. 13 is a perspective view of another carriage showing a different key portion on the carriage.

To allow a manifold assembly to be used with systems having differing requirements for the filtration characteristic of the filter, shuttle assemblies may be arranged with key portions for different filtration characteristics. For example, as shown in FIG. 13, a carriage 44 of a shuttle assembly 14 may include a key portion 70 having a configuration different from the configuration of the key portion 70 of the carriage 44 shown in FIG. 10. In the illustrated embodiment, the key portion 70 of the carriage 44 of FIG. 13 may include two key elements 70a, 70b having configurations which are different from the configuration of the key portion 70, e.g., the key elements 70a, 70b, of the carriage 44 shown in FIG. 10. The key elements 70a, 70b shown in FIG. 13 may differ in orientation, e.g., the narrow regions 64 of both key elements 70a, 70b being in the 12:00 position. Alternatively or additionally, the key elements may differ in location, shape, and/or size. The different configuration of the key portion 70 may correspond to a different filtration characteristic for the filter, say, a removal rating of 0.3 μm. Then, only filters having a key portion with a configuration corresponding to the desired filtration characteristic, e.g., a removal rating of 0.3 μm, such as the key portion 63, e.g., the key elements 63a, 63b of the filter 11 shown in FIG. 11 may be seated in the shuttle assembly 14, e.g., the carriage 44, of FIG. 13. Again, other filters having different filtration characteristics and, therefore, key portions with different configurations, such as the filter 11 shown in FIG. 3, may not be seated on the shuttle assembly 14, e.g., the carriage 44, of FIG. 13 because the key portions, e.g., the key elements, of those filters will not mate with the key portion 70, e.g., the key elements 70a, 70b, of the shuttle assembly 14 or carriage 44 of FIG. 13.

Figure 14:
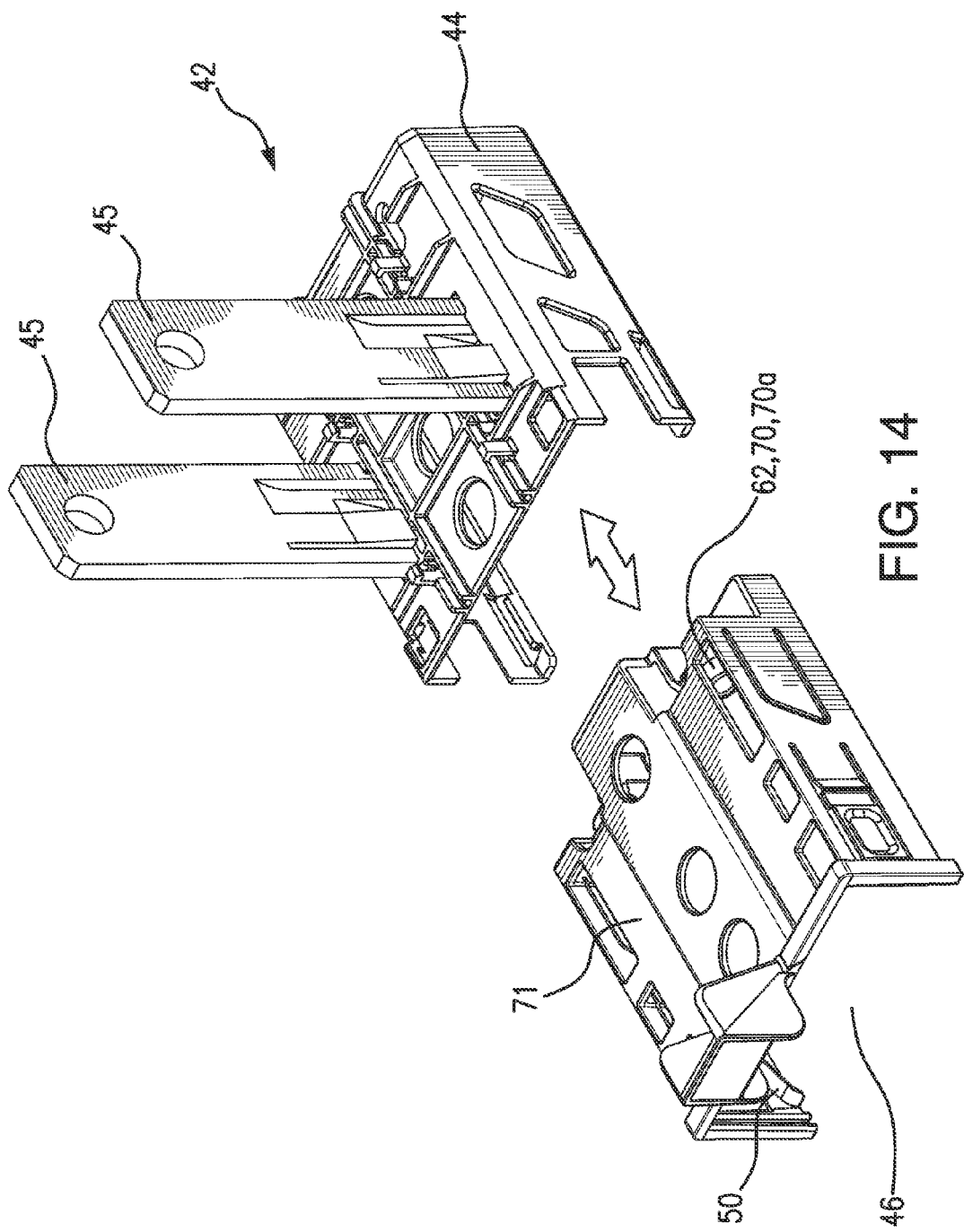
FIG. 14 is a perspective view of a carriage with a tray removed from the carriage.

Shuttle assemblies having different key portions may be variously structured. For some embodiments, the shuttle assembly may include a removable tray that includes the key portion of the shuttle assembly. For example, the carriage may include a tray 71 that may slide in and out of the open end 46 of the carriage 44, as shown in FIG. 14, and each tray 71 may include the key portion of the carriage 44. In the illustrated embodiment, the tray 71 may include the two key elements positioned, for example, along a rear portion of the tray 71. The tray may be mounted to the shuttle assembly in any of several ways. For example, the tray 71 may slide in and out of the carriage 44 and may be removably fitted to the carriage 44 by means of a snap-fit arrangement. Different trays may include key portions with different configurations corresponding to different filtration characteristics. Providing a shuttle assembly with a key portion having a configuration corresponding to a particular filtration characteristic may then simply involve selecting the tray with the key portion having the configuration corresponding to the desired filtration characteristic and mounting that tray to the carriage after removing any tray that has a different key portion configuration. Alternatively or additionally, the key portion itself, e.g., the key elements, may be removably and/or rotatably mounted to the shuttle assembly, e.g., the carriage or the tray, allowing the configuration of the key portion to be changed to correspond to a different filtration characteristic by simply replacing or reorientating the key portion, e.g., the key elements. In still other embodiments, different carriages, or different carriage assemblies, having key portions with different configurations corresponding to different filtration characteristics may be provided.

The present invention encompasses innumerable embodiments and is not restricted to the particular embodiments that have been described, illustrated, and/or suggested herein. Rather, the present invention includes all embodiments and modifications that may fall within the scope of the claims.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "for example," "such as," and "e.g.") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for moving a filter along a manifold assembly, the filter having a permeable filter medium and having a filtration characteristic comprising permeable filter medium removal or permeable filter medium retention rating, permeable filter medium material, permeable filter medium surface area, type of fluid to be filtered by the filter, flow rate or pressure drop associated with the filter and/or permeable filter medium wettability; first and second filter fittings, the first filter fitting comprising a filter inlet fitting and the second filter fitting comprising a filter outlet fitting; a housing defining a fluid flow path within the housing between the first and second filter fittings, the first and second filter fittings being in fluid communication with the fluid flow path, the permeable filter medium being arranged in the fluid flow path within the housing to remove one or more substances from a fluid flowing along the fluid flow path, wherein the housing includes a housing body having a longitudinal axis and a flange positioned on an upper region of the housing body and extending outwardly in a direction generally perpendicular to the longitudinal axis, wherein the flange includes an outwardly-facing wall; and a filter key portion including first and second key elements spaced from one another on the outwardly-facing wall of the flange, the manifold assembly comprising a manifold body comprising first and second manifold fittings, a shuttle assembly moveably mounted to the manifold body, and an actuator mechanism for moving the shuttle assembly, the shuttle assembly comprising a carriage for receiving and supporting the filter, the carriage having an open end, side walls comprising shelves, and a rear wall and a carriage key portion including first and second carriage key elements spaced from one another on the rear wall; the method comprising:

inserting the filter into the open end of the carriage such that the first and second filter key elements face the first and second carriage key elements and seating the filter on the shelves of the side walls of the carriage, including mating the first and second filter key elements, wherein the first and second filter key elements have a configuration that corresponds to a filtration characteristic of the filter, and to the first and second carriage key elements, respectively, wherein the first and second carriage key elements have a configuration that corresponds to the filtration characteristic of the filter and is mateable with the configuration of the first and second filter key elements, and actuating the actuator mechanism and moving the shuttle assembly and the seated filter from a first position, wherein the first and second filter key elements are mated to the first and second carriage key elements, respectively, and the first and second filter fittings are spaced from first and second manifold fittings, to a second position, wherein the first and second filter key elements are mated to the first and second carriage key elements, respectively, and the first and second filter fittings sealingly engage the first and second manifold fittings, respectively.

2. The method of claim 1 further comprising actuating the actuator mechanism and moving the shuttle assembly from the second position to the first position to disengage the first and second filter fittings from the first and second manifold fittings.

3. The method of claim 1 wherein the shuttle assembly comprises a carriage assembly comprising the carriage, and moving the shuttle assembly includes moving the carriage assembly between the first and second positions in response to movement of the actuator mechanism between first and second positions.

4. The method of claim 3 wherein moving the carriage assembly between the first and second positions includes pivoting a lever between a first position and a second position, the carriage assembly moving between the first and second positions in response to movement of the lever between the first and second positions.

5. The method of claim 4 wherein pivoting the lever includes moving a crank mechanism which imparts linear, coaxial motion between the first and second filter fittings and the first and second manifold fittings.

6. The method of claim 1 further comprising selecting the filter from among a plurality of filters having filter key elements with configurations that correspond to a plurality of filtration characteristics of the filters, wherein the filtration characteristics and the corresponding configurations differ from filter to filter and not all of the configurations of the filter key elements are mateable with the configuration of the carriage key elements.

7. A filter arrangement comprising:
a filter having first and second filter fittings, the first filter fitting comprising a filter inlet fitting and the second filter fitting comprising a filter outlet fitting; a permeable filter medium, the filter having a filtration characteristic comprising permeable filter medium removal or permeable filter medium retention rating, permeable filter medium material, permeable filter medium surface area, type of fluid to be filtered by the filter, flow rate or pressure drop associated with the filter and/or permeable filter medium wettability, wherein the filter includes a housing and the permeable filter medium, the housing defining a fluid flow path within the housing between the first and second filter fittings, the first and second filter fittings being in fluid communication with the fluid flow path, and the permeable filter medium being arranged in the fluid flow path within the housing to remove one or more substances from a fluid flowing along the fluid flow path, wherein the housing includes a housing body having a longitudinal axis and a flange positioned on an upper region of the housing body and extending outwardly in a direction generally perpendicular to the longitudinal axis, wherein the flange has an outwardly-facing wall;
a manifold assembly having a manifold body comprising first and second manifold fittings, a shuttle assembly movably mounted to the manifold body, and an actuator mechanism for moving the shuttle assembly, the shuttle assembly comprising a carriage for receiving and supporting the filter, the carriage having an open end, side walls comprising shelves, and a rear wall, and
a keying mechanism including a filter key portion including first and second filter key elements spaced from one another on the outwardly-facing wall of the flange, and a carriage key portion including first and second carriage key elements spaced from one another on the rear wall of the carriage, wherein the first and second filter key elements have a configuration that corresponds to the filtration characteristic of the filter and the first and second carriage key elements have a configuration that corresponds to the filtration characteristic of the filter and is mateable with the configuration of the first and second filter key elements, the shuttle assembly being arranged to receive the filter such that the first and second filter key elements face the first and second carriage key elements and being moveable between a first position, wherein the first and second filter key elements are mated to the first and second carriage key elements, respectively, and the first and second filter fittings are spaced from the first and second manifold fittings, and a second position, wherein the first and second filter key elements are mated to the first and second carriage key elements, respectively, and the first and second filter fittings sealingly engage the first and second manifold fittings, respectively.

8. The filter arrangement of claim 7 wherein the shuttle assembly includes a carriage assembly comprising the carriage and the actuator mechanism, and wherein the carriage assembly moves between the first and second positions in response to movement of the actuator mechanism between first and second positions.

9. The filter arrangement of claim 8 wherein the actuator mechanism includes a pivotable lever and a crank mechanism coupled to the lever and the carriage assembly.

10. The filter arrangement of claim 7 where one of the filter key elements and the carriage key elements comprise a protrusion and the other comprises a recess which matingly receives the protrusion.

11. The filter arrangement of claim 7 wherein the carriage includes a tray having a front end having the open end and a back end, the carriage key portion being located at the back end of the tray and the filter being moveable along the tray from a first position, wherein the filter is received at the front end of the tray, to a second position, wherein the filter is seated on the tray with the first and second filter key elements mated to the first and second carriage key elements at the back end of the tray.

12. The filter arrangement of claim 11 wherein the tray is removably mounted to the carriage.

13. A filter assemblage including the filter arrangement of claim 7, wherein the carriage comprises a first carriage, and the filter comprises a first filter having first and second filter key elements, the filter assemblage further comprising a second filter having first and second filter key elements, wherein the second filter includes first and second filter fittings, the second filter first fitting comprising a second filter inlet fitting and the second filter second fitting comprising a second filter outlet fitting, a second housing defining a fluid flow path within the second housing between the first and second filter fittings, the second filter inlet fitting and the second filter outlet fitting being in fluid communication with the fluid flow path, a permeable filter medium arranged in the fluid flow path to remove one or more substances from a fluid flowing along the fluid flow path, and a filtration characteristic which is different from the filtration characteristic of the first filter, wherein the second housing includes a second housing body having a longitudinal axis and a second filter flange positioned on an upper region of the second housing body and extending outwardly in a direction generally perpendicular to the longitudinal axis, wherein the flange includes an outwardly-facing wall, the first and second filter key elements of the second filter being located on the outwardly-facing wall of the second filter flange and wherein the first and second key elements of the second filter key have a configuration that corresponds to the filtration characteristic of second filter, is different from the configuration of the first and second filter key elements of the first filter, and is not mateable with the configuration of first and second carriage key elements of the first carriage.

14. The filter assemblage of claim 13 wherein the manifold assembly comprises a first manifold assembly and the shuttle assembly comprises a first shuttle assembly, the filter assemblage further comprising a second manifold assembly comprising a second manifold body having first and second manifold fittings, and a second shuttle assembly moveably mounted to the second manifold body, the second shuttle assembly comprising a second carriage for receiving and supporting the second filter, the second carriage having an open end, side walls comprising shelves, and a rear wall, and first and second carriage key elements of the second carriage on the rear wall, wherein the first and second carriage key elements of the second carriage have a configuration that corresponds to the filtration characteristic of the second filter, is mateable with the configuration of the first and second key elements of the second filter, respectively, and is not mateable with the configuration of the first and second filter key elements of the first filter, the second shuttle assembly being arranged to receive the second filter such that the first and second filter key elements of the second filter face the first and second carriage key elements of the second carriage and being moveable between a first position, wherein the first and second filter key elements of the second filter are mated to the first and second carriage key elements of the second carriage, respectively, and the first and second fittings of the second filter are spaced from the first and second fittings of the second manifold assembly, and a second position, wherein the first and second filter key elements of the second filter are mated to the first and second carriage key elements of the second carriage, respectively, and the first and second fittings of the second filter sealingly engage the first and second fittings of the second manifold assembly, respectively.

15. A filter which is mountable to a manifold assembly wherein the manifold assembly comprises a manifold body comprising first and second manifold fittings, a shuttle assembly movably mounted to the manifold body, and an actuator mechanism for moving the shuttle assembly, the shuttle assembly comprising a carriage for receiving and supporting the filter, the carriage having an open end, side walls comprising shelves, and a rear wall, and first and second carriage key elements spaced from one another on the rear wall, the filter comprising:

a permeable filter medium, the filter having a filtration characteristic comprising permeable filter medium removal or permeable filter medium retention rating, permeable filter medium material, permeable filter medium surface area, type of fluid to be filtered by the filter, flow rate or pressure drop associated with the filter, and/or permeable filter medium wettability;

first and second fittings, the first fitting comprising a filter inlet fitting and the second fitting comprising a filter outlet fitting; a permeable filter medium;

a housing defining a fluid flow path within the housing between the first and second fittings, the first and second fittings being in fluid communication with the fluid flow path, the permeable filter medium being arranged in the fluid flow path within the housing to remove one or more substances from a fluid flowing along the fluid flow path, wherein the housing includes a housing body having a longitudinal axis and a flange positioned on an upper region of the housing body and extending outwardly in a direction generally perpendicular to the longitudinal axis, wherein the flange includes an outwardly-facing wall; and first and second filter key elements located on the outwardly-facing wall of the flange, such that as the filter is mounted to the manifold assembly, the first and second filter key elements face the first and second carriage key elements, respectively, wherein the first and second filter key elements comprise a configuration comprising a protrusion or recess, that corresponds to the filtration characteristic of the filter and is mateable with the first and second carriage key elements, respectively.

16. The filter of claim 15 wherein the first and second filter key elements are positioned on the flange on opposite sides of the outwardly-facing wall of the flange.

17. The filter of claim 15 wherein the outwardly-facing wall of the flange includes an inset and a filter key element is positioned in the inset.

18. A filter assemblage including the filter of claim 16 wherein the filter comprises a first filter and the filter assemblage further comprises a second filter having a filtration characteristic different from the filtration characteristic of the first filter, wherein the second filter comprises first and second fittings, the second filter first fitting comprising a second filter inlet fitting and the second filter second fitting comprising a second filter outlet fitting, a permeable filter medium, a second housing defining a fluid flow path within the housing between the first and second fittings, the second filter inlet fitting and the second filter outlet fitting being in fluid communication with the fluid flow path, the permeable filter medium being arranged in the fluid flow path within the second housing to remove one or more substances from a fluid flowing along the fluid flow path, wherein the second housing includes a second housing body having a longitudinal axis and a second flange positioned at the top of the second body and extending outwardly in a direction generally perpendicular to the longitudinal axis, wherein the second flange includes an outwardly-facing wall; and a second filter key portion located on the outwardly-facing wall of the second flange such that as the second filter is mounted to the manifold assembly, the first and second filter key elements of the second filter face the first and second carriage key elements, wherein the first and second filter key elements of the second filter have a configuration that corresponds to the filtration characteristic of the second filter and is different from the configuration of the first and second filter key elements of the first filter.

* * * * *